United States Patent [19]
Claassen

[11] Patent Number: 6,069,672
[45] Date of Patent: May 30, 2000

[54] REMOTE CONTROL FOR A RECEIVER

[75] Inventor: Henning J. Claassen, Lüneburg, Germany

[73] Assignee: C.I.S. Hotel Communications GmbH, Luneburg, Germany

[21] Appl. No.: 08/836,138

[22] PCT Filed: Nov. 3, 1995

[86] PCT No.: PCT/EP95/04326

§ 371 Date: Jul. 16, 1997

§ 102(e) Date: Jul. 16, 1997

[87] PCT Pub. No.: WO96/15629

PCT Pub. Date: May 23, 1996

[30] Foreign Application Priority Data

Nov. 9, 1994 [DE] Germany .......................... 94 17 937 U
Jun. 1, 1995 [DE] Germany .......................... 195 20 180

[51] Int. Cl.[7] .............................. H04N 7/16; H04N 5/44; H04Q 5/22; G08C 19/00
[52] U.S. Cl. .......................... 348/734; 348/5.5; 348/734; 340/825.31; 340/825.69; 340/825.72; 345/158; 341/176; 359/142; 359/146

[58] Field of Search .............................. 345/158; 348/5.5, 348/734; 340/825.69, 825.72, 825.31; 341/176; 359/142, 146

[56] References Cited

U.S. PATENT DOCUMENTS

| 5,353,016 | 10/1994 | Kurita et al. ............................ 348/734 |
| 5,410,326 | 4/1995 | Goldstein ................................ 348/134 |
| 5,420,573 | 5/1995 | Tanaka et al. ..................... 340/825.24 |
| 5,488,411 | 1/1996 | Lewis .......................................... 348/8 |

*Primary Examiner*—John K. Peng
*Assistant Examiner*—Paulos M. Natnael
*Attorney, Agent, or Firm*—Armstrong, Westerman, Hattori, McLeland & Naughton

[57] ABSTRACT

A cordless remote control for a receiver, more particularly for a television set, comprising a reader for a data medium, said data medium containing information for the activating the remote control and/or at least one program channel of said receiver.

28 Claims, 4 Drawing Sheets

REMOTE CONTROL FOR A RECEIVER

BACKGROUND OF THE INVENTION

1. Field of the Invention

The invention relates to a remote control for a receiver, more particularly for a television set.

2. Description of the Prior Art

In local receiver networks, as operated in hotels and clinics or hospitals, in particular in so-called pay TV networks having individual pay TV channels in addition to the usual station channels of private and public broadcasting stations, keeping a record of reception or viewing time of channels subject to payment, namely pay TV channels, necessitates a special technical reequipment for the pay TV operator. In known pay TV systems the viewing hours relevant to individual television sets are each signalled via a separate line from each television set to a central accounting point and from there in conclusion to final invoicing of the guest or patient at the end of his stay in the hotel or hospital. Due to the lines and circuitry necessary for this purpose central accounting is highly complicated.

Television sets are already known for which authorization cards can be acquired by purchasing. These authorization cards are introduced into a card reader, a so-called swipe, in the television set which is then unblocked. The drawback of this solution is that constructional changes need to be made to the television set.

DE 42 17 649 A1 discloses using a swipe to unblock a television set or telephone, the swipe being included in a bed control unit. This bed control unit comprises entry keys which can be used for switching the television set ON/OFF and for channel selection. As an alternative it is proposed to eliminate these entry keys on the bed control unit and to provide instead a telephone or an infrared control means. As a further alternative the entry keys are to be provided on the swipe.

In DE 42 17 648 A1 a bed control unit having a swipe is disclosed, the control unit being connected to a control means in a remote control means, whereby headphones are connectable to the remote control means and unblocking use of a television set follows depending on the information stored in a swipe card.

DE 42 18 125 A1 shows that a control unit having the form of a telephone receiver can be used for remote control of a display monitor, an authorization check being implemented in the telephone receiver as to whether the user of the telephone receiver has authority to use a television set or not. It is proposed that this check be made via a corresponding chip card.

In EP-A-317404 a pay TV system is described in which a card reader is provided in the television set.

FR-A-2696888 discloses a remote control in which the function of the remote control can be determined by a plug-in storage card.

In DE-A-4212200 a remote control system is disclosed which serves to operate household appliances by using an IC card and a remote public telephone capable of processing said IC card via a public telephone network.

The aforementioned devices have, however, the disadvantage that monitoring ON of the television set necessitates means of a relatively complex configuration and installing these means is relatively complicated.

SUMMARY OF THE INVENTION

The invention thus has the object to simplify, and thus also to make cheaper, means for monitoring ON of various television sets including the devices necessary therefor such as e.g. remote controls and, where desired, clocking the ON times of individual or all program channels of a receiver.

This object is achieved by a cordless remote control for a television set of a pay TV system comprising a reader for a data medium, said data medium containing information for activating said remote control and/or at least one program channel of said receiver, wherein said remote control is assigned a code (C); and said remote control comprises a device for writing said code (C) of said remote control on said data medium, a device for reading said code (C) from said data medium on said remote control, and a device for comparing said read code (C) to said code (C) of said remote control and for controlling the unblocking of said remote control; and a method of unblocking a remote control for a television set of a pay TV system, wherein a code (C) assigned to said remote control is written onto a data medium by a writer integrated in said remote control; said code (C) store on said data medium is read by said remote control; said code (C) assigned to said remote control is compared to said code (C) read from said data medium; and it being established from said comparison whether said data medium has already been used for unblocking some other remote control.

In accordance with the invention a reader for a data medium containing information for activating the remote control and/or least a program channel of the receiver, for instance a chip or magnetic strip card, a perforated strip card, an optical or other suitable data medium, is arranged in or on a remote control or the housing thereof. There remote control is assigned a code, this code being written on the data medium by a device of remote control, read from the data medium and compared to the code of the remote control.

By means of this data medium reader the remote control itself and/or a program channel of a receiver is activated when the receiver type is correspondingly specified and/or the data medium introduced into the reader is recognized by it to be valid. For this purpose the control data for various receiver types can be stored on the card. Especially preferred is an arrangement in which a program key or a power ON key of the remote control itself is unblocked.

By arranging the data medium reader in or on the remote control the additional wiring systems hitherto necessary for known pay TV networks are eliminated as a result of which the network itself or its installation can be substantially simplified and made cheaper. In addition, a remote control configured as such can be used for signalling various receiver types. Converting receivers, as mandatory in the case of swipe means mounted on the unit itself, is also eliminated. Thus, a pay TV operator can operate his network with no change until he is in possession of remote controls configured in accordance with the invention which he then simply needs to replace for the remote controls used hitherto. More particularly, in changing from central booking to a localized decentralized booking there is no need for him to convert or even totally replace his expensive television sets.

The data medium reader is preferably integrated in the remote control which presents no problem for a series of conventional remote controls due to ample space being available. Otherwise a somewhat large housing would need to be provided for a remote control.

In accordance with a particularly preferred embodiment of the invention the reader is configured as a reader/writer combination. This makes it possible not only to verify the validity of an inserted data medium by the read procedure but also to write the data medium following selection of an unblocked program channel or an unblocked key of the remote control to register the unblocking action on the data medium. It is particularly preferred to further connect such a reader/writer to a time counter to also note on the data medium the time units clocked by a time counter corresponding to the viewing time of the unblocked program channel. On the other hand the data medium stores information as to whether one or more program channels are unblocked, or the number of unblock actions still available or the duration of allocated remaining viewing time. It is likewise in keeping with the invention when the time of unblocking and end of the time allocated for viewing is noted on the card. If it is merely desired to operate various receiver types with the remote control, then the writer can be eliminated.

It is especially simple, and convenient for the hotel guest or the patient in a hospital or his visitors when the data medium permits a large number of unblock procedures or a lengthy duration of use. The data medium can be procured by purchase once by the user, used until the end of its duration and then simply disposed of. This also affords maximum rationalization for the operator of receivers to be unblocked, for instance a pay TV operator, since namely using his system does not need to be invoiced individually for each user. Valid data media need merely to be made available or sold. If necessary, the used data medium may be returned and put back into circulation after having been updated or reprogrammed.

In a preferred embodiment the data medium carries the information needed to signal a plurality of different receiver types with the remote control. Selecting the desired type in each case can be done either on the remote control itself by swapping the data with the corresponding receiver or by the user via a key pad of the remote control. For implementing the aforementioned functions it is not a mandatory requirement that further information, in addition to that needed to signal the various types of receivers, exists on the card.

The invention is preferably employed in hotel and hospital pay TV networks, a pay TV network for the purpose of the invention being understood as a local closed circuit having its own transmitting station and television sets connected thereto which are often of different types. The station produces its own programs, more particularly video films, which can be distributed in the closed circuit to the connected television sets and dialled into by the users. In addition each television set is able to receive program channels broadcasted from outside the network. For recording the viewing times of the program channels, likewise simply termed pay TV, covering a large viewing area, for example, "Premiere", the invention can be put to use likewise to advantage.

The receiver type selection possible with the remote control in accordance with the invention can be put to use to advantage on pay TV networks having differing types of receivers.

Television sets in conventional pay TV networks feature a series of program channels received from private or public broadcasting stations and made available to the user at no charge, as well as a series of program channels for which payment is due which are distributed to the individual receivers of the pay TV network for example via closed-circuit video systems. In this case in general only these pay program channels need to be unblocked, whilst the remaining channels can be made use of without a valid data medium.

The invention can also be put to use to advantage in private applications. Thus, a child lockout may be employed to advantage.

In this case, also as regards pay TV networks, also all program channels may be locked out and unblocked only by insertion of a valid data medium, unblocking of simply a central power ON button also being sufficient, should such a button be provided.

In the case of a local network of receivers via which the pay program channels can be received, as is the case in pay TV, each remote control is preferably assigned to a specific receiver. This prevents abuse resulting from a user, after first-time unblocking of his remote control, gaining access to other receivers, likewise needing unblocking, without being required to pay for the use thereof. Receivers are already available on the market which have a sensor incorporated, preset to the emitter of a specific remote control or which can be set thereto.

Since, however, not all manufacturers offer such preset or settable receivers and the by far majority of receivers in use do not as yet include this desirable additional feature, a preferred embodiment is proposed by which modifications are needed simply in the remote control and an additional emitter/sensor is assigned to the receiver not necessitating any constructional changes on the receiver itself, however.

This device can be eliminated, however, when the receiver type is specified to the remote control, it then being possible to detect unblocking of program channels of other receivers by the data exchange between remote control and receiver. In addition, receivers of the same type can be made distinguishable for the remote control e.g. by allocating ID numbers.

In accordance with a first embodiment of the invention the data medium is "individualized", i.e. rendered usable only for one specific receiver or a specific remote control and in a second embodiment the remote control itself is usable only for a specific receiver.

For identifying the receiver as being "operable" or "non-operable" an emitter/sensor is applied to the receiver or in its vicinity. When the power key or the program key to be unblocked on the remote control is pressed the remote control first emits an ID signal which is sensed and identified by the emitter/sensor. If the emitter/sensor "sees" the signal received from the remote control as being OK, it in turn sends an OK signal back to the remote control. This signal is received by the remote control which in turn is equipped in accordance with the invention, with a corresponding sensor. It is not until such a signal is received and a valid data medium recognized by the reader that the remote control is unblocked.

In a further preferred embodiment of the invention the remote controls themselves may be coded, the code specified for a remote control then being written on a chip card after it has been inserted in a corresponding writer/programmer for programming. This code stored on the chip card can be read by the remote control. By comparing the code assigned to the remote control and the code read onto the chip card it can be established whether this chip card has already been used for unblocking another remote control. It can thus be prevented that a single chip card is used to unblock more than one remote control. This is important e.g. in the case of hotel pay TV systems with which the guest as a rule is able to switch on the television set as often as he likes over 24 hours for a fixed (invoiced) fee. In an alternative preferred embodiment the code must first be written on the chip card, e.g. when the chip card is purchased, to be able to operate a specific remote control coded with this code.

A further preferred embodiment of the invention provides for the chip card needing to remain in the remote control to permit certain program channels to be unblocked, these channels possibly being solely pay TV channels or pay TV channels and regular no-charge channels.

Although these embodiments are unable to prevent identical television sets, the sensor signal of which is not codable, from being switched on by one and the same remote control, they do ensure that the card itself cannot be used to unblock several remote controls (and thus television sets).

Should, for instance, in a hospital two television sets exist in a sick-room, then only one television set can be unblocked at any one time since ejecting the chip card from the remote control would automatically result in the remote control concerned, and thus the unblocked television set or its pay TV program, being switched off.

In yet a further embodiment of the invention a chip card can be used to unblock various remote controls, the different codes of the unblocked remote controls being stored on the chip card. Accordingly, all unblock actions of the various remote controls are stored on the chip card and can be correspondingly invoiced or debited after use.

BRIEF DESCRIPTION OF THE DRAWINGS

Preferred example embodiments of the invention will now be described relative to the attached drawings disclosing further features and advantages of the invention, in which.

DESCRIPTION OF THE PREFERRED EMBODIMENTS

Figure 1:
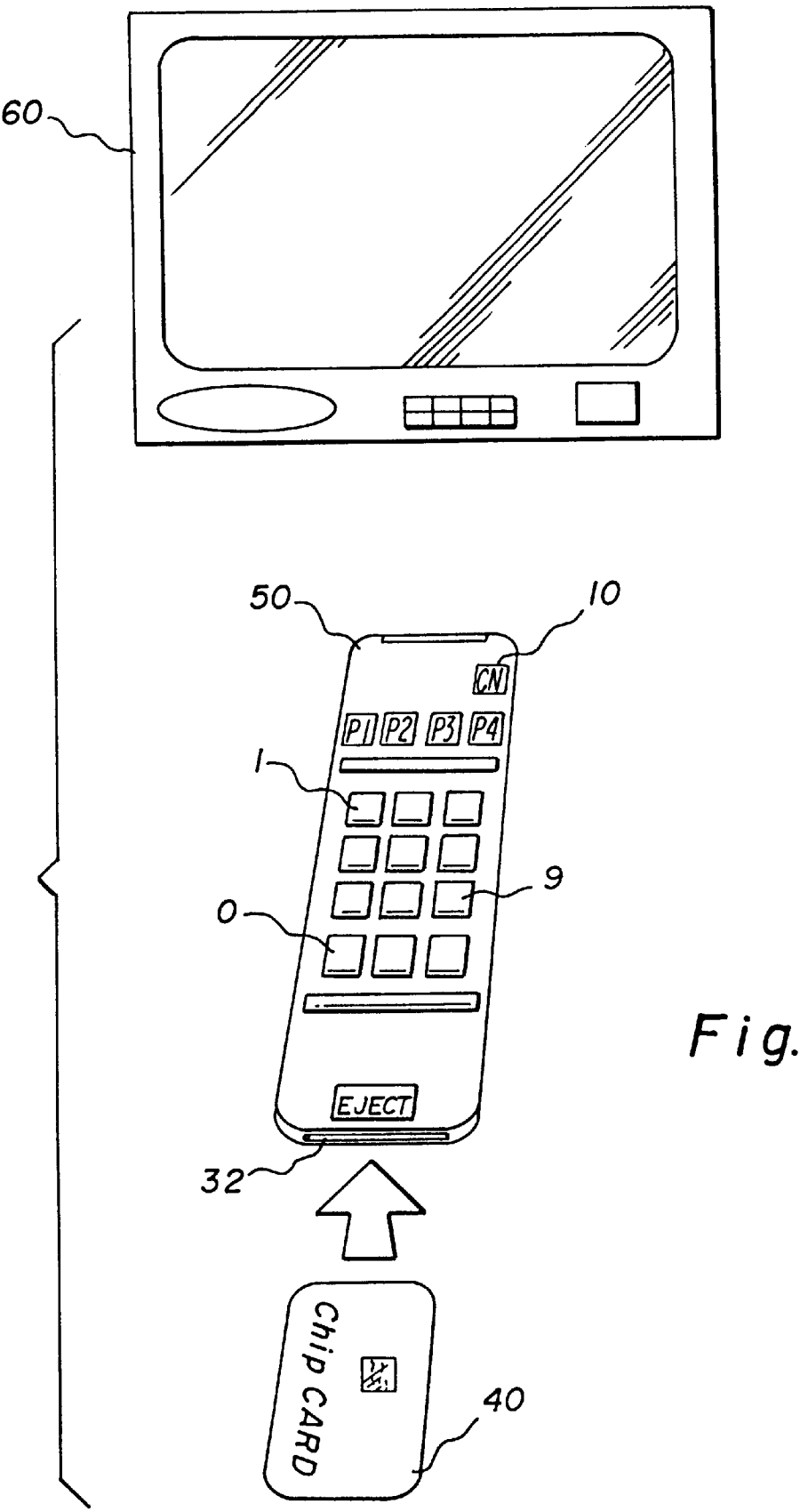
FIG. 1 illustrates a remote control in accordance with the invention.

FIG. 1 illustrates a remote control 50 having a slot 32 for inserting a data medium 40, in this example embodiment a chip card, in the region of a reader/writer 30 (FIG. 4) integrated in the remote control 50. By means of this remote control 50 a receiver 60 is operated which is connected to a local network, namely a pay TV network. The remote control 50 is provided with a power key 10 and program keys 1–9 and 0 as well as non-identified user keys via four program keys P1–P4 for selecting one of four pay program channels. It will readily be appreciated that the program keys may be replaced by a single button rocker.

Figure 2:
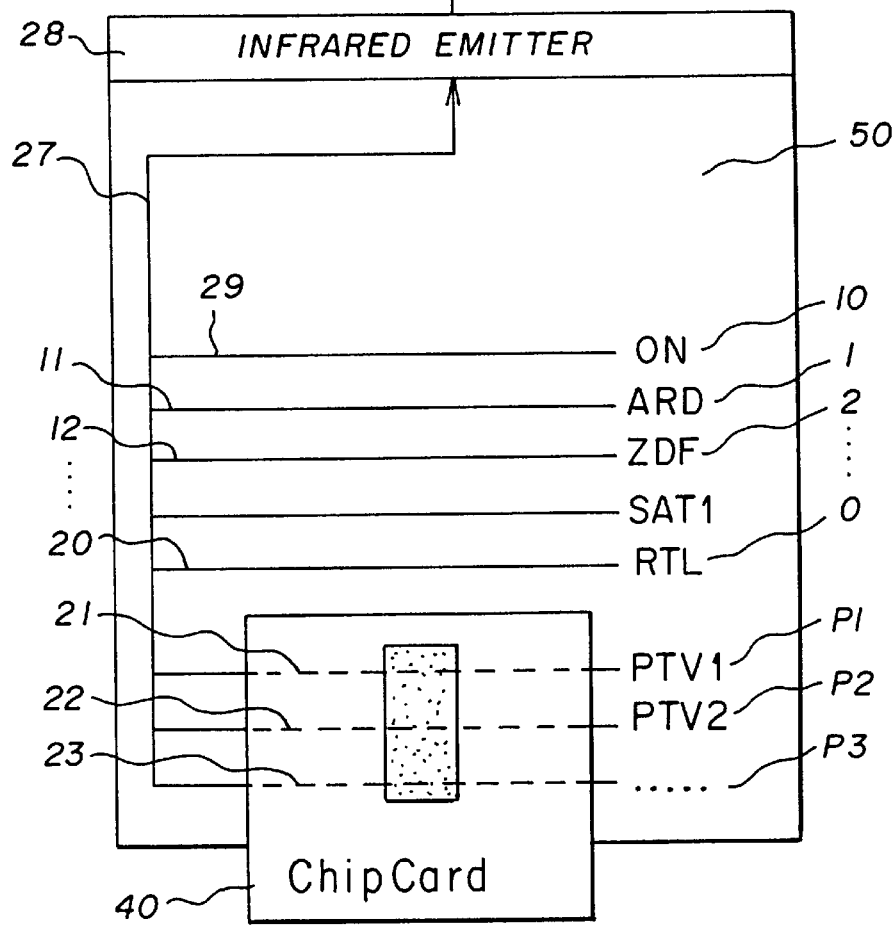
FIG. 2 illustrates a first embodiment of the remote control as shown in FIG. 1.

FIG. 2 shows a first embodiment of the remote control in accordance with the invention in which merely the pay TV program channels P1–P4 of the television set 60 need to be unblocked for viewing by the user. In this example embodiment unblocking is done solely by unblocking the corresponding program keys P1–P4 on the remote control, whilst on the television set 60 no constructional changes are needed to disable or unblock the program channels P1–P4.

A signal path leads from each of the program keys 1–9 and 0, the power key 10 and the pay TV program keys P1–P4 to an emitter 28 of the remote control 50. The corresponding signal leads 11–24, 29 of the cited keys lead in conclusion via the signal lead 27 to the emitter 28, which in this example embodiment is an infrared. Depending on which key has been pressed the emitter 28 transmits a chararacteristic emission signal S which is received by the corresponding sensor 62 of the television set 60. As far as the program keys 1–9, 0 and the power key 10 are concerned the remote control 50 shown in FIG. 2 corresponds co a conventional remote control. The user has no trouble selecting each of the program channels set on the television set 60 and selectable by pressing the corresponding program key. The emitter 28 of the remote control 50 will not receive any input signal via the signal lead 27 when one of the pay TV program keys P1–P4 is pressed and no chip card 40 is inserted in the slot 32 indicated in FIG. 1.

In accordance with a very simple embodiment of the invention this is achieved by the signal leads 21–24 leading from the program keys P1–P4 and finally via the signal lead 27 to the emitter 28 of the remote control 50 being open-circuited and not being reclosed by a reader in the example embodiment (not shown in FIG. 2) until a chip card 40 recognized by this reader as being valid is properly inserted.

Figure 3:
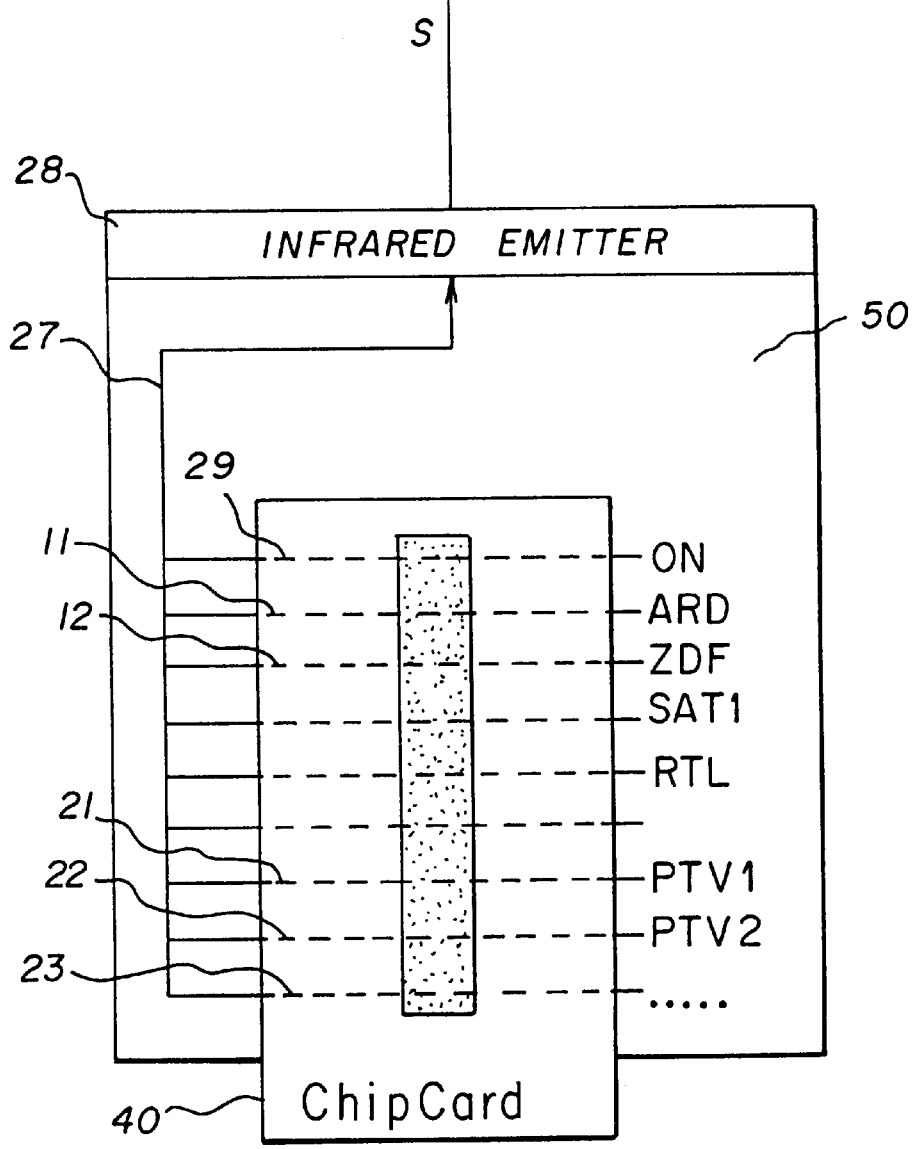
FIG. 3 illustrates a second embodiment of the remote control as shown in FIG. 1.

FIG. 3 shows a further embodiment of a remote control 50 in accordance with the invention. In this variant all program keys 1–9, 0 and the power key 10 need to be unblocked by means of the chip card 40. The further details of this embodiment as shown in FIG. 3 correspond to those as illustrated in FIG. 2.

Figure 4:
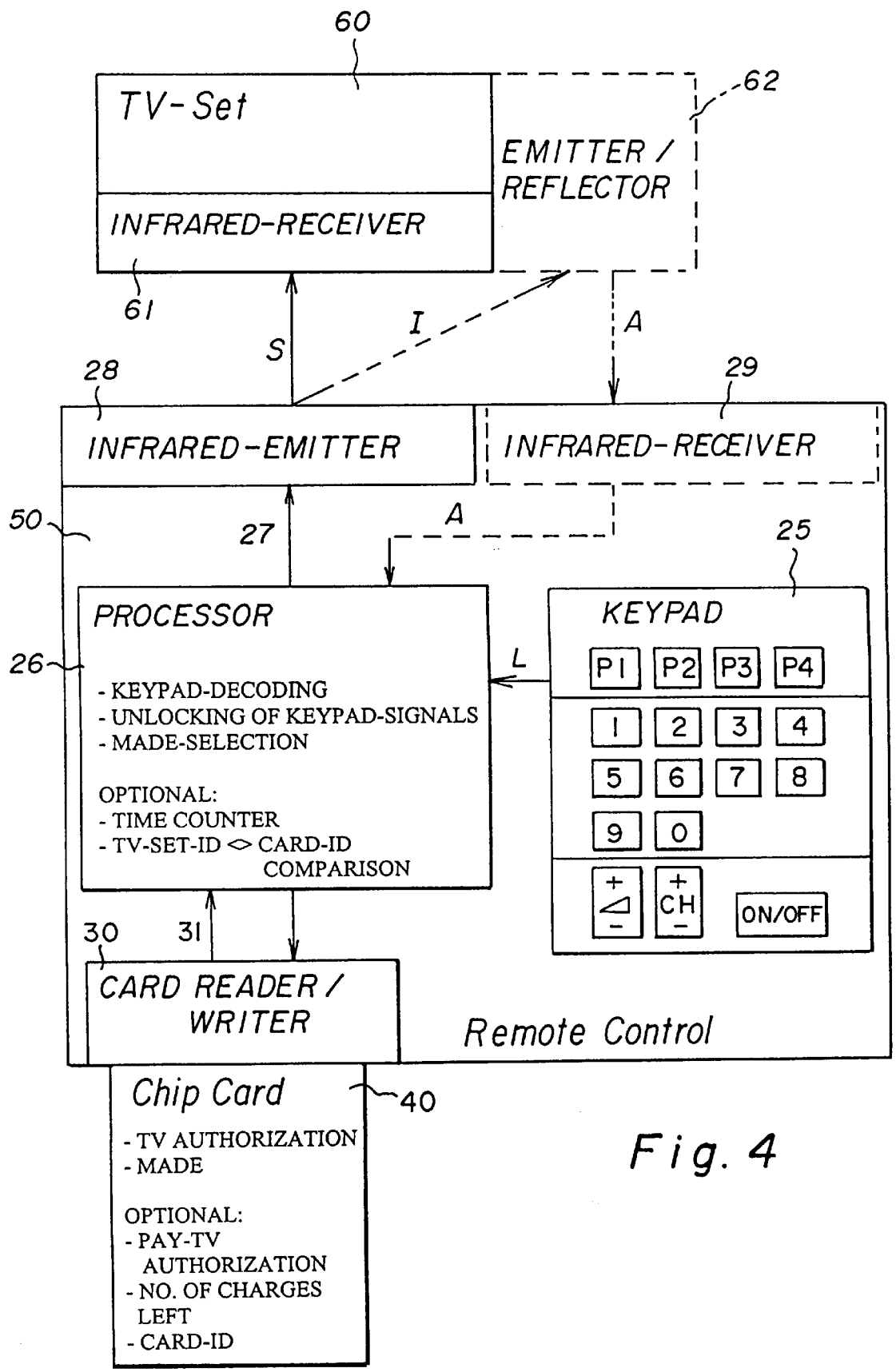
FIG. 4 illustrates a remote control in accordance with the invention having an additional sensor.

In the example embodiment illustrated in FIG. 4 the remote control 50 comprises in addition to the emitter 28 also a sensor 29. Fitted to the television set 60 is an additional emitter/sensor 62 which receives the ID signal I from the emitter 28 of the remote control and, in turn, sends a authorization signal A when the ID signal I is "seen" by the emitter/sensor 62 as being an authentic signal; otherwise the emitter/sensor 62 remains mute. It is to be noted that the emitter/sensor 62 may be physically connected to the television set but not necessarily so, there existing no electrical or other signal connection between the emitter/sensor 62 and the television set 60.

It will readily be appreciated that this modification is to be made only on receivers which have not already been dedicated by the manufacturer to the signals of a specific remote control or provided with means of adjustment, e.g. for a pay TV operator.

The remote control 50 illustrated in FIG. 4 comprises a key pad 25 comparable to that of the remote control 50 shown in FIG. 1.

The signal leads 11–24, 29, indicated separately in FIGS. 2 and 3, are signified in FIG. 4 by the lead bus L. The lead bus L connects an input of a suitable circuit or a processor 26 which comminicates via a further data bus 31 with the reader/writer 30. Via lead bus L the processor 26 receives the information as to which of the keys of the key pad 25 have been pressed. If the pressed key involved is one requiring prior unblocking—which may be the pay TV keys P1–P4 or all program keys—the processor 26 will only output a control signal to the emitter 28 via the signal lead 27 when it has received the information from the reader/writer 30 via the bus 31 that a valid chip card 40 is inserted.

In identification and authorization in accordance with the invention the emitter 28 outputs an ID signal I as a first signal individual to the remote control concerned, intended for the emitter/sensor 62. The emitter/sensor 62 establishes whether the emitted ID signal I is authentic or not. When signal I is authentic, the emitter/sensor 62 in turn sends an authorization signal A which is received by the sensor 29 of the remote control 50. The sensor 29 in turn passes on the authorization signal A to the processor 26. It is only when the processor 26 has received such an authorization signal A from the sensor 29 right from the start and then the further conditions as cited above are satisfied that the processor passes on a power ON or program select signal S to the emitter 28 of the remote control 50 which in turn sends the signal S to the sensor 61 of the television set 60, this sensor 61 being one of the usual sensors for remote control signals.

In still a further embodiment of the invention which may also be designed without the devices and methods described above, the remote control 50 comprises a reader 30, preferably also a reader/writer 30, into which the chip card 40 can be inserted. Stored on this chip card 40 is information as to various types of receivers so that following entry of a code for specifying the receiver type via the key pad 25, control signals for controlling the emitter 28 of the remote control 50 can be generated by the processor 26 of the remote control 50 so that the existing receiver type can be signalled. Likewise, all signals emitted by the television set 60 can be received by the sensor 29 of the remote control 50 and correctly processed by the processor 26 since the type of the receiver is known to the latter. Accordingly, different types of receivers can be signalled by means of the above remote control in conjunction with the chip card 40.

In yet another preferred embodiment of the invention the code for specifying the type of receiver need not be entered via the key pad 25. For this purpose the remote control 50 first sends one or more ID signals I to the television set 60 when the corresponding key is pressed in the key pad 25. The television set "sees" the presence of the control wanted by the remote control 50 and sends an answer signal A back to the remote control 50, after having received the ID signal I, this answer signal being received by the sensor 29. Contained in the answer signal A of the television set 60 is information as to the type of receiver concerned. Following receipt of the answer signal A this information can be decoded by the processor 26 of the remote control 50 so that the processor 26 is able to adapt the operating requests to the corresponding type of receiver via the key pad 25 and forward via the signal lead 27 corresponding control signals to the emitter 28 of the remote control 50, these control signals then being received by the sensor 61 of the television set 60 and subsequently correctly decoded as to their meaning.

Thus, the remote control 50 can be activated as a function of the selection specific to the type of receiver involved.

What is claimed is:

1. A cordless remote control for television set of a pay TV system comprising
    a) a reader for a data medium, said data medium containing information for activating said remote control and/ or at least one program channel of a receiver,
   wherein
    b) said remote control is assigned a code (c); and
    c) said remote control comprises
        c1) a device for writing said code (c) of said remote control on said data medium,
        c2) a device for reading said code (c) from said data medium on said remote control, and
        c3) a device for comparing said read code (c) to said code (c) of said remote control and for controlling the unblocking of said remote control.

2. The remote control as set forth in claim 1, wherein said reader is integrated in said remote control.

3. The remote control as set forth in claim 1 or 2, wherein said data medium reader is provided for unblocking a program key (P1–P4, 1–9) or power key (0) of said remote control.

4. The remote control as set forth in claim 3, wherein a signal path from said program or power key (P1–P4, 1–9, 0) to an emitter of said remote control is closed on unblocking.

5. The remote control as set forth in claim 3, wherein a circuit is provided for controlling said unblocking actions, said circuit receiving via a lead signal from said reader that a valid data medium has been inserted into said reader or not.

6. The remote control as set forth in claim 3, wherein each program key (P1–P4, 1–9, 0) and said power key (10) need to be unblocked.

7. The remote control as set forth in claim 3, wherein only selected program keys (P1–P4) need to be unblocked.

8. The remote control as set forth in claim 1, wherein said reader is configured as a combined reader/writer.

9. The remote control as set forth in claim 8, wherein said reader/writer notes an unblocking action on said data medium.

10. The remote control as set forth in claim 8, wherein said data medium is a chip card on which the viewing time of an unblocked program channel can be noted or debited.

11. The remote control as set forth in claim 1, comprising a sensor for receiving an authorization signal (A) emitted by an emitter/sensor assigned to said receiver to be operated when said emitter/sensor has previously received an authentic ID signal (I) from an emitter of said remote control.

12. The remote control as set forth in claim 11, wherein said authorization signal (A) is applied to said circuit and an unblocking action will only occur when said sensor of said remote control has received an authorization signal (A).

13. The remote control as set forth in claim 1, wherein information is stored on said data medium as to specific types of receiver.

14. The remote control as set forth in claim 13, wherein the sending protocol of said remote control is adapted to said information stored on said data medium corresponding to said type of receiver by means of a key pad in accordance with the specification of said type of receiver.

15. The remote control as set forth in claim 13, wherein said remote control sends one or more ID signals to said receiver and receives from the latter an answer signal from which the type of receiver can be determined.

16. The remote control as set forth in claim 1, wherein said data medium needs to remain in said remote control to permit viewing certain program channels.

17. The remote control as set forth in claim 1, wherein data signals are exchanged between said receiver and said remote control.

18. The remote control as set forth in claim 17, wherein firstly an ID signal is emitted by an emitter of said remote control.

19. The remote control as set forth in claim 17, wherein said receiver emits an authorization signal (A) in response to an ID signal from said remote control when said ID signal is authentic.

20. The remote control as set forth in claim 17, wherein said receiver cannot be operated by said remote control until a sensor of said remote control has received an authorization signal (A).

21. The remote control as set forth in claim 17, wherein a monetary amount is debited by said data medium of said remote control after receiving an authorization signal (A) or after specific time units.

22. A local network comprising
    a) remote control receivers
    b) receiving pay and non-pay program channels from a transmitting station of said local network,
   wherein
    c) a cordless remote control as set forth in claim 1 is used for unblocking a program channel.

23. The local network as set forth in claim 22, wherein a reader/writer of said remote control is used for booking the value of the time used from a data medium.

24. The local network as set forth in claim 22, wherein a data exchange is used between a receiver and a remote control for identifying said remote control and/or for authorization.

25. A method of unblocking a remote control for a television set of a pay TV system, wherein
   a) a code (C) assigned to said remote control is written onto a data medium by a writer integrated in said remote control;
   b) said code (C) stored on said data medium is read by said remote control;
   c) said code (C) assigned to said remote control is compared to said code (C) read from said data medium; and
   d) it being established from said comparison whether said data medium has already been used for unblocking some other remote control.

26. The method as set forth in claim 25, wherein a signal path from a program key (P1–P4, 1–9, 0) to an emitter of said remote control is closed when unblocked.

27. The method as set forth in claim 25, wherein a reader/writer notes on said data medium an unblocking action.

28. The method as set forth in claim 25, wherein the time used by an unblocked program channel is noted or debited on said data medium.

* * * * *